(12) United States Patent
Norton et al.

(10) Patent No.: US 8,178,460 B2
(45) Date of Patent: May 15, 2012

(54) EXHAUST TREATMENT SYSTEM AND METHOD OF OPERATION

(75) Inventors: Daniel George Norton, Niskayuna, NY (US); Benjamin Hale Winkler, Albany, NY (US); Ashish Balkrishna Mhadeshwar, Storrs, CT (US); Dan Hancu, Clifton Park, NY (US); Stanlee Teresa Buddle, Gloversville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/316,646

(22) Filed: Dec. 12, 2011

(65) Prior Publication Data

US 2012/0082605 A1    Apr. 5, 2012

Related U.S. Application Data

(63) Continuation of application No. 12/873,141, filed on Aug. 31, 2010, now Pat. No. 8,101,145.

(51) Int. Cl.
*B01D 53/56* (2006.01)
*B01D 53/94* (2006.01)
*B01J 38/00* (2006.01)

(52) U.S. Cl. ...... 502/20; 502/34; 423/213.2; 423/239.1; 423/DIG. 5; 422/108; 422/111; 60/277; 60/295; 60/301

(58) Field of Classification Search ............... 423/213.2, 423/239.1, DIG. 5; 422/108, 111; 60/277, 60/295, 301; 502/20, 34
See application file for complete search history.

(56) References Cited

U.S. PATENT DOCUMENTS

| | | | |
|---|---|---|---|
| 5,279,997 A | 1/1994 | Montreuil et al. | |
| 6,029,623 A | 2/2000 | Weissman et al. | |
| 7,090,811 B2 | 8/2006 | Cho et al. | |
| 7,329,790 B2 | 2/2008 | Bjorklund et al. | |
| 7,487,631 B2 | 2/2009 | Cueman et al. | |
| 2007/0000243 A1* | 1/2007 | Liu et al. | 60/299 |
| 2007/0070468 A1 | 3/2007 | Ogawa | |
| 2008/0098728 A1 | 5/2008 | Winkler et al. | |
| 2008/0131345 A1 | 6/2008 | Vitse et al. | |
| 2009/0173061 A1 | 7/2009 | Vitse et al. | |
| 2009/0263297 A1 | 10/2009 | Hancu et al. | |
| 2009/0277159 A1* | 11/2009 | Driscoll et al. | 60/286 |
| 2010/0307140 A1 | 12/2010 | Viola et al. | |

OTHER PUBLICATIONS

Kari Eranen, Lars-Eric Lindfors, Anna Niemi, Pernilla Elfving, Lennart Cider; Abstract : "Influence of Hydrocarbons on the Selective Catalytic Reduction of NOx over Ag/Al2O3—Laboratory and Engine Tests"; 2 Pages, Oct 16, 2000.

* cited by examiner

*Primary Examiner* — Timothy Vanoy
(74) *Attorney, Agent, or Firm* — Paul J. DiConza

(57) ABSTRACT

An exhaust treatment method is provided. Method of increasing activation of NOx reduction catalyst using two or more reductant is discussed. The NOx catalyst is disposed to receive both the exhaust stream and reductant stream. The sensor is disposed to sense a system parameter related to carbon loading of the catalyst and produce a signal corresponding to the system parameter. The controller is disposed to receive the signal and to control dosing of the reductant stream based at least in part on the signal. The method includes sensing a system parameter related to carbon loading of a catalyst, producing a signal corresponding to the system parameter and sending the signal to a controller; and controlling a dosing of a reductant stream based at least in part on the signal.

20 Claims, 2 Drawing Sheets

EXHAUST TREATMENT SYSTEM AND METHOD OF OPERATION

CROSS REFERENCE TO RELATED APPLICATIONS

This application is a continuation of U.S. patent application Ser. No. 12/873,141, now U.S. Pat. No. 8,101,145 entitled "EXHAUST TREATMENT SYSTEM AND METHOD OF OPERATION" filed on Aug. 31, 2010, which application is hereby incorporated by reference.

This application is related to U.S. patent application Ser. No. 12/873,127, entitled "EXHAUST TREATMENT SYSTEM AND METHOD OF OPERATION" filed on Aug. 31, 2010, which application is hereby incorporated by reference.

BACKGROUND

The invention relates generally to an exhaust treatment system and method of operating the exhaust treatment system.

Exhaust streams generated by the combustion of fossil fuels in, for example, furnaces, ovens, and engines, contain nitrogen oxides (NOx) that are undesirable pollutants. There is a growing need to have efficient and robust exhaust treatment systems to treat the NOx emissions.

In selective catalytic reduction (SCR) using hydrocarbons (HC), hydrocarbons serve as the reductants for NOx conversion. Hydrocarbons employed for HC-SCR include relatively small molecules like methane, ethane, ethylene, propane and propylene as well as longer linear hydrocarbons like hexane, octane, etc. or branched hydrocarbons like iso-octane. The injection of several types of hydrocarbons has been explored in some heavy-duty diesel engines to supplement the HC in the exhaust stream. From an infrastructure point of view, it would be advantageous to employ an on-board diesel fuel as the hydrocarbon source for HC-SCR.

The use of fuels, including gasoline or diesel fuel as SCR reductants, leads to a number of disadvantages when trying to clean up the exhaust gases. During the combustion process, the catalyst may get poisoned by some part of the exhaust gas, such as sulfur dioxide ($SO_2$), or from the formation of base metal compounds from the components of a catalyst composition. The NOx absorption performance of the catalyst declines as the poisoning of the catalyst increases. Therefore, it is desirable to have an exhaust treatment system and method of operation that will help to mitigate poisoning and increase the catalyst performance.

BRIEF DESCRIPTION

One embodiment of the application is a method. The method includes sensing a system parameter related to carbon loading of a catalyst, producing a signal corresponding to the system parameter and sending the signal to a controller; and controlling a dosing of a reductant stream based at least in part on the signal.

One embodiment of the application is a method. The method includes producing a reductant stream, injecting a fuel into an exhaust stream, sensing a system parameter related to carbon loading of a catalyst, producing a signal corresponding to the system parameter and sending the signal to a controller, comparing the signal with a predetermined value, estimating the carbon loading, injecting an oxygenate into the exhaust stream if the carbon loading is estimated to exceed a predetermined level, and regulating a ratio of oxygenate to fuel in the exhaust stream for a calculated duration of time. The catalyst is disposed to receive the exhaust stream and the reductant stream, and the system parameter is a post-catalyst NOx concentration, a space velocity of the catalyst, temperature of the catalyst, temperature of the exhaust stream, a flow rate of the exhaust stream, or any combinations.

One embodiment of the application is a method. The method includes producing a reductant stream and directing the reductant stream to be received by a catalyst, producing an exhaust stream and directing the exhaust stream to be received by the catalyst, injecting a fuel into the exhaust stream, sensing a post catalyst NOx concentration and sending the signal corresponding to the post catalyst NOx concentration to a controller, comparing the signal with a predetermined threshold point of post catalyst NOx concentration, determining the time when the post catalyst NOx concentration exceeds the threshold point, and regenerating the catalyst by injecting an oxygenate into the exhaust stream for a calculated duration of time.

DETAILED DESCRIPTION

The systems and methods described herein include embodiments that relate to controlling reductant stream dosing for enhancing the performance of an exhaust treatment system comprising a catalyst that promotes reduction of nitrogen oxide (NOx). Such catalysts are referred to herein as NOx catalyst.

In the following specification and the claims that follow, the singular forms "a", "an" and "the" include plural referents unless the context clearly dictates otherwise.

As used herein, without further qualifiers, a catalyst is a substance that may cause a change in the rate of a chemical reaction without itself being consumed in the reaction. "Activation" of a catalyst relates to increasing the performance efficiency of the catalyst at a given set of operating conditions. "Deactivation" of a catalyst, a decrease in the performance efficiency, may happen because of certain system and operating conditions including temperature of operation, time of operation, and exposure of catalyst to carbonaceous materials. "Dosing" includes composition and amount of reductants supplied to a reductant stream. Dosing may be changed by changing a ratio of different reductants in the reductant stream or by changing the flow rates of reductants of the reductant stream. Approximating language, as used herein throughout the specification and claims, may be applied to modify any quantitative representation that may permissibly vary without resulting in a change in the basic function to which it is related. Accordingly, a value modified by a term such as "about" is not to be limited to the precise value specified. In some instances, the approximating language may correspond to the precision of an instrument for measuring the value. All temperatures given herein are for atmospheric pressure.

Figure 1:
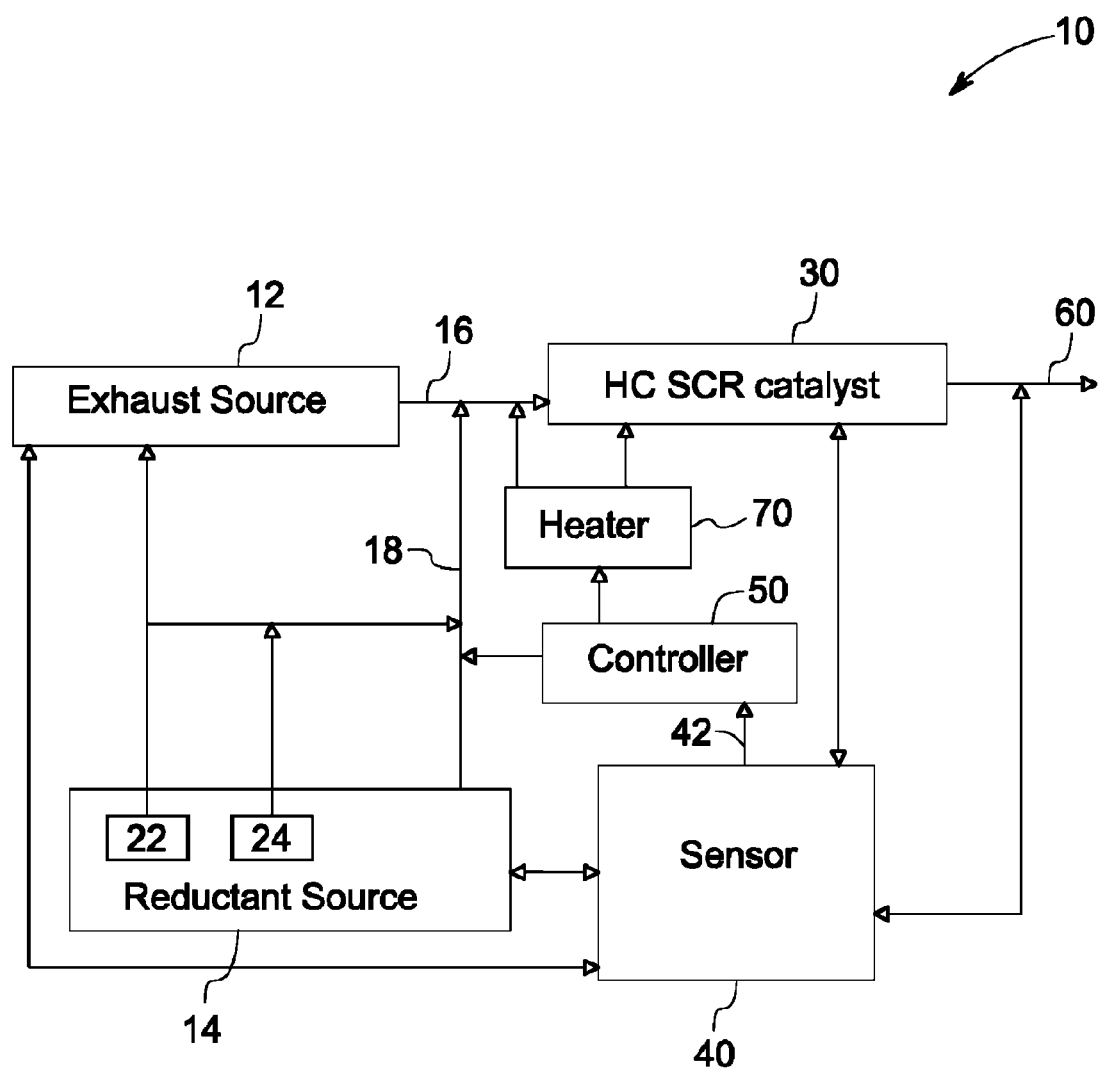
FIG. 1 is a schematic diagram of an exhaust treatment system in accordance with one embodiment of the invention.

In one embodiment, an exhaust treatment system 10 is provided as shown in FIG. 1. The exhaust treatment system 10 comprises an exhaust source 12, a reductant source 14, a NOx catalyst 30, a sensor 40 and a controller 50. An exhaust treatment system 10 reduces undesirable emissions in an exhaust stream 16 generated by the exhaust source 12, such as a combustion engine. A combustion engine is any engine that accepts fuel, performs an action by burning the fuel, and emits an exhaust stream. In one embodiment, the combustion engine is an internal combustion engine in which the combustion of a fuel occurs with an oxidizer in a combustion chamber resulting in an expansion of the high temperature and pressure gases that may be applied to move a movable component of the engine. Examples of combustion engines include gasoline engines, diesel engines, and turbine engines, reciprocating engines, rotary engines, and any engine that produces exhaust gases.

The internal combustion engine may be part of any of a variety of mobile or fixed/stationary assets, for example, an automobile, locomotive, or power generator. Different engines have different combustion characteristics and the exhaust stream components differ from one engine to another. Such differences may include variations in $NO_x$ levels, presence of sulfur, oxygen level, steam content, and the presence or quantity of other species. Changes in the operating parameters of the engine may also alter the exhaust flow characteristics. Examples of differing operating parameters may include temperature and flow rate of fuel and air. The exhaust treatment system 10 may be used to reduce $NO_x$ to nitrogen at a desirable rate and at a desirable temperature appropriate for the given system and operating parameters.

A reductant source 14 supplies reductants to the exhaust treatment system 10. Reductant source 14 may include one or more storage places (such as tanks or compartments) for reductants or may include one or more points of origins for continuous supply of reductants. The reductant source 14 may be designed to supply two or more reductants. In one embodiment, the reductant source 14 is a combination of different storage places for the different reductants. In one embodiment, different storage places of the reductant source 14 may exist separately from one another within the exhaust treatment system 10. In another embodiment, the storage places of the reductant source 14 may co-exist, for example, where the first and second reductants are to be stored as a mixture, in one storage place. For the ease of description, the reductant source 14 is described herein throughout the specification as an example of a reductant source comprising a first reductant and second reductant. However, the application is in no way limited in scope to the use of only two reductants in the reductant source or only one storage place for the different reductants.

The reductant source 14 is disposed to inject a reductant stream 18 into the exhaust stream 16. NOx catalyst 30 is disposed to receive the exhaust stream 16 and the reductant stream 18. The reductant stream 18 may contain one or more reductants at any given point of time during the operation of the exhaust treatment system. The reductants in the reductant stream 18 may be of different kinds that are used to reduce the exhaust gases such as NOx. In one embodiment, reductant comprises diesel fuel, ultra low sulfur diesel (ULSD), biodiesel fuel, Fischer-Tropsch fuel, gasoline, ethanol, methanol, isopropyl alcohol, n-propanol, n-butanol, methyl tert-butyl ether, E85, kerosene, or any combinations thereof.

In one embodiment, the reductant source 14 comprises a first storage place 22 and a second storage place 24. In one embodiment, a first storage place 22 comprises a fuel tank disposed to supply fuel to the exhaust source 12 and to inject fuel through a reductant stream 18 into an exhaust stream 16 emitting from the exhaust source. Fuel may be of different kinds that are used to run the exhaust sources 12. In one embodiment, fuel comprises a material selected from the group consisting of diesel fuel, ultra low sulfur diesel (ULSD), biodiesel fuel, Fischer-Tropsch fuel, gasoline, kerosene, and any combination thereof. The second storage place 24 comprises an oxygenate tank disposed to inject oxygenates into the exhaust stream 16 through the reductant stream 18. In one embodiment, the second reductant comprises an oxygenate. An oxygenate is a component, generally comprising reductants suitable for enhancing NOx reduction efficiency of the catalysts or for regeneration of the catalysts. An oxygenate is a liquid organic species containing oxygen as a part of its chemical structure. Examples of the oxygenates that may be used as a reductant in the present exhaust treatment system include, but not limited to ethanol, methanol, isopropyl alcohol, n-propanol, n-butanol, methyl tert-butyl ether, E85, gasoline, and any combinations thereof.

NOx catalyst 30 is used to reduce NOx content of an exhaust stream 16. A NOx catalyst capable of substantially reducing NOx through selective catalytic reduction (SCR) using hydrocarbons (HC) is known as an HC-SCR catalyst. It is desirable to use NOx catalysts that may influence NOx reduction across a wide range of temperatures and operating conditions. In one embodiment, a NOx catalyst 30 is a catalyst composition comprising a metal disposed upon a mesoporous inorganic oxide substrate. As used herein, without further qualifiers, "mesoporous" refers to a material containing pores with diameters in a range of from about 2 nanometers to about 50 nanometers.

The substrate may include an inorganic material. Suitable inorganic materials may include, for example, oxides, carbides, nitrides, hydroxides, carbonitrides, oxynitrides, borides, or borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metallic cations used in the foregoing inorganic materials may be transition metals, alkali metals, alkaline earth metals, rare earth metals, or the like.

In one embodiment, the catalyst substrate includes oxide materials. In one embodiment, the catalyst substrate includes alumina, zirconia, silica, zeolite, or any mixtures comprising one or more of these materials. Suitable substrate materials may include, for example, aluminosilicates, aluminophosphates, hexaaluminates, zirconates, titanosilicates, titanates, or a combination of two or more thereof. In one embodiment, the metal oxide is an aluminum oxide. In other embodiments, other substrates may be suitable and may be selected based on end-use parameters. In one embodiment, the composition of an HC-SCR NOx catalyst includes a templated metal oxide substrate having a plurality of pores, and a catalyst material comprising a catalyst metal disposed on the substrate, as described in US Patent Application 20090074641A1.

Suitable catalyst metal may include one or more of gallium, indium, rhodium, palladium, ruthenium, and iridium. Other suitable catalyst metal includes transition metal elements. Suitable catalyst metal also includes one or more of platinum, gold, and silver. In one embodiment, the catalyst metal comprises silver. In one particular embodiment, the catalyst metal is substantially 100% silver.

Typically, soot, sulfur-containing compounds, and unreacted hydrocarbons adsorb on the surface of the catalyst during operation of the exhaust source 12. The adsorbed species block the active surface of the NOx catalyst 30 from the exhaust stream 16, thereby reducing the efficiency of the NOx catalyst 30. Measuring efficiency reduction of the NOx catalyst 30 at certain points and taking actions to improve efficiency of the catalysts may enhance the catalyst performance over a period. At some point, the efficiency of the NOx catalyst 30 may be reduced to a point that the pollutant gases, such as $NO_x$, are not sufficiently removed from the exhaust stream to meet predetermined exhaust control specifications. A periodic or need-based reactivation of the NOx catalyst 30 may return the NOx content emitted from the exhaust treatment system 10 to an acceptable level.

In one embodiment, diesel fuel is a convenient reductant for reducing NOx from a diesel engine exhaust, because diesel is readily available as a fuel and in a diesel-engine-powered system, such as a locomotive, the diesel fuel is already stored on board. However, other reductants, such as ethanol, are sometimes more active than diesel for SCR of NOx. For example, NOx reduction on a silver-templated alumina catalyst is higher in the presence of ethanol than in the presence of diesel at some operating conditions. In an example where diesel is used as a reductant for NOx, more active reductants such as ethanol may be used in combination with or instead of diesel to boost the NOx conversion in operating conditions where diesel may not meet desired NOx conversion or in situations where catalyst activity has degraded over time. However, using ethanol at all times as a sole reductant instead of diesel would, for example, inconveniently increase the tank size of ethanol to be carried on board a vehicle employing the exhaust treatment system.

Two or more reductants may be used to optimize the NOx conversion over a NOx catalyst 30. For example, a reductant that gives good NOx conversion at a comparatively low temperature may be used in combination with another reductant that gives good NOx conversion at comparatively high temperature to extend the operating range of the SCR catalyst. In one embodiment, ethanol is more active as a reductant than diesel at lower operating temperatures of the engine exhaust. A controller may be implemented to preferentially inject more oxygenate (such as ethanol in the current example) in situations where higher oxygenate content in the reductant stream 18 would improve the performance of the system 10.

It is desirable to enhance reduction efficiency of the NOx catalyst without undue increase of weighted fuel penalty of the system. In an embodiment where the first reductant is engine fuel and second reductant is an oxygenate, fuel penalty is determined by measuring quantity of fuels and oxygenates used, and the relative value of the fuels and oxygenates. Weighted fuel penalty value is determined by relative price and the size constraints and refilling frequency of the oxygenate fuel tank. For example, it may be possible to operate a controller to minimize NOx by adjusting the reductant flow rates, and adjusting the oxygenate/fuel ratio. However, doing so may lead to unnecessary oxygenate expenditure, thereby increasing requirement of the tank volume of oxygenate and thereby weighted fuel penalty. Therefore, striking a balance between the reduction efficiency increment of the NOx catalyst and the weighted fuel penalty is desirable.

The second reductant can be used to enhance catalyst efficiency through two methods, named herein as catalyst reactivation and catalyst regeneration. In catalyst reactivation, the presence of second reductant facilitates the NOx reduction of the catalyst, thereby making the catalyst more active for NOx reduction at certain system and operating conditions.

For example, during the engine start-up time, the temperature of the exhaust stream and/or the catalyst may be less than the optimum temperature required for the NOx catalyst to effectively reduce NOx using only diesel (first reductant). In such case, ethanol, or some other oxygenate (second reductant) that is more active as reductant than diesel at lower temperature ranges, may be injected as the sole reductant or in a mixture with the diesel. As the catalyst warms up, the amount of oxygenate used may be decreased while increasing the amount of diesel reductant. A sensor 40 may be employed to measure the temperature and a controller 50 may be used to compare the temperature with an available data set, to analyze the amount of oxygenate required to maintain the required NOx reduction, and to inject that amount of oxygenate to the diesel reductant stream.

Similarly, two or more reductants may be used to optimize the NOx conversion over the catalyst's lifetime. A more active second reductant may be used to boost the NOx conversion on a NOx catalyst 30 that typically uses a less active first reductant, as the catalyst loses activity over its operating lifetime. For example, the NOx catalyst 30 performance may decrease due to aging, and in such cases, continuous injection of a measured amount of more active second reductant may help in keeping the NOx reduction in the required levels. For example, the use of oxygenate reductant, such as ethanol, may be increased over the lifetime of the catalyst as the catalyst activity degrades, to boost the NOx conversion across part of or all of the operating range as necessary to meet the requirements for NOx reduction.

In catalyst regeneration, the second reductant restores the NOx reduction efficiency of the catalyst thereby making the catalyst substantially regain its original catalytic activity. Therefore, regeneration of catalyst is a revival of the catalyst to perform to a predetermined level at a given set of operating conditions by, for instance, removing undesirable deposits from the catalyst. In one embodiment, the regeneration restores greater than about 80% of the initial performance of the catalyst at similar operating conditions. For example, if a SCR catalyst is reducing NOx using diesel as a reductant, and the efficiency of NOx reduction of the catalyst reduces over time, regenerating the catalyst will increase the catalytic efficiency to about 80% of its original efficiency or greater while using engine fuel as the reductant. In a further embodiment, the catalyst performance after regeneration is greater than about 90% of the initial performance at similar operating conditions. By regeneration, in one embodiment, the catalyst performance is restored to the initial level at similar operating conditions.

In one embodiment, restoration of catalyst reduction efficiency by the second reductant is through reaction of the reductant with the deposits such as carbon and burning off the deposits from the catalyst surface.

The second reductant may be a single reductant or a mixture of reductants formulated based on factors such as, but not limited to, reduction efficiency, economic advantage, and environmental effects. In one example, hydrogen is used as a co-reductant with ethanol and/or diesel to improve NOx conversion at low temperatures.

During exhaust treatment, different applications may demand different levels of catalyst performance. Further, measurement of catalyst performance during operation at certain operating conditions may not be straightforward. Catalyst performance at any point of time may depend on a combination of different factors, including, but not limited to, age of the catalyst, temperature of exhaust stream, product of the exhaust, and/or volume of the exhaust. For example, a system may have 100 ppm NOx as the catalyst output, with 150 ppm at the catalyst inlet, translating to about 33% NOx conversion. This conversion may be termed as an efficient performance in some conditions, such as where the exhaust temperature is about 250° C., and the reductant is a ULSD at a carbon to nitrogen ratio (C:N) of 1:1. However, the same performance may be termed as unsatisfactory under other conditions, such as where if the temperature of the exhaust stream is at about 375° C. and the reductant dosing comprises a C:N of 6:1.

In general, there is competition for consumption of the reductant(s) by both direct oxidation (combustion) and through reduction of NOx. Additionally, there is a tradeoff for higher C:N ratios between increased availability of reductant for NOx reduction and increased carbon deposits on the catalyst. At lower temperatures (<350° C.), the rate of direct oxidation decreases faster than the rate of the consumption by the reduction of NOx. The rate of reductant desorption decreases at lower temperatures, causing the catalyst surface coverage by the reductant to increase. Therefore, at lower temperatures, lower carbon to NOx ratios generally achieve optimal performance. At higher temperatures (>350° C.) the rate of reductant direct oxidation increases, and the rate of reductant desorption from the catalyst increases. Therefore, at higher temperatures, higher carbon to NOx ratios generally achieve optimal performance.

Therefore, it is desirable to have a "trigger point" triggering a reactivation or regeneration when a predicted NOx output from the catalyst under given operating conditions approaches a predetermined value (within some tolerance) such as, for example, a regulation limit.

In one embodiment, a sensor 40 is disposed to sense a system parameter of the exhaust treatment system 10 and to produce a signal 42 corresponding to the system parameter. A controller 50 is disposed to receive the signal 42 and to control dosing of the reductant stream 18 based at least in part on the signal 42. However, trigger points for controller actions may be designed based on data obtained before and/or during operation of the exhaust source.

A system parameter is any parameter that affects the quality of treated exhaust 60 coming out from the exhaust treatment system 10 after the NOx catalyst 30 reduction treatment. A system parameter may be an in-situ parameter determined during operation of the exhaust source 12 and/or a pre-determined parameter determined based on the laboratory tests. System parameters may include, for example, exhaust stream 18 composition parameters, exhaust stream 18 temperature parameters, exhaust stream flow parameters, exhaust source parameters, and time parameters. Examples of an exhaust stream composition parameter include concentration of $NO_x$ in the exhaust stream, and space velocity of the catalyst. The concentration of NOx in the exhaust stream may be a pre-catalyst NOx concentration or a post-catalyst NOx concentration. In one particular embodiment, a post-catalyst concentration of NOx that is, the NOx concentration of the gases down-stream of the catalyst, is used as a system parameter. Space velocity is herein defined as the normalized ratio of exhaust flow rate to the volume of the catalyst. In one embodiment, a predetermined NOx concentration may vary in the range from about 1 ppmV to about 2000 ppmV. In one embodiment, a catalyst space velocity is in the range from about 1000 $hr^{-1}$ to about 200,000 $hr^{-1}$. Examples of an exhaust stream 18 temperature parameter include temperature of the NOx catalyst, and temperature of the exhaust stream. In one embodiment, temperature of the NOx catalyst can be increased using a heater 70. In one embodiment, the exhaust stream 18 temperature parameter is the temperature of the exhaust stream. The NOx catalyst 30 may get influenced by temperature of the exhaust stream and therefore change its NOx reduction characteristics based on the temperature of the exhaust stream. In one embodiment, the exhaust temperature is between about 200° C. and about 650° C. Examples of an exhaust stream flow parameter include respective flow rates of the exhaust stream, reductant stream, and air stream. The flow rates may be measured as molar, mass, or volumetric flow rates. In one embodiment, ratio of a molar flow rate of carbon in the reductant stream to the molar flow rate of nitrogen in NOx in the exhaust stream is between about 0 and about 12. Examples of the exhaust source parameter include source speed, torque, and source power.

One measure of catalyst performance at a given point of time at certain operating conditions is the deposit of carbonaceous materials on the NOx catalyst. During operation of the exhaust source, carbonaceous materials such as carbon are deposited on the catalyst. The amount of carbonaceous material deposited (also called "carbon loading") may be estimated by measuring some or all of the system parameters and correlating these parameters and carbon loading with data previously developed under controlled conditions, as in a laboratory, for example. A time average estimated carbon loading may predict a catalyst deactivation or decrease in catalyst efficiency. In one embodiment, carbon loading of the catalyst is a measure of catalyst deactivation. A dosing strategy that achieves desired conversion of NOx with minimum weighted fuel penalty based on the operating conditions may be estimated and controlled using the controller.

Some data relating to carbon loading of a catalyst may be obtained in controlled tests. The exhaust conditions may be simulated in the laboratory and the catalyst performance may be documented at different operating conditions. Trigger points may be formulated based on the analysis of carbon loading at different conditions in the laboratory tests. Information obtained from sensors about the system parameters during operation of the exhaust source may aid to judge the operating conditions and carbon loading and thereby catalyst performance and deactivation.

Different dosing strategies can be applied to the reductant stream to increase the catalyst activation. The dosing strategy includes changing one or more of first reductant dosing rate, second reductant dosing rate, ratio of second reductant to first reductant, first reductant flow rate, and second reductant flow rate. In one embodiment, once the controller receives the system parameter signals, the controller determines which dosing strategy yields the desired conversion at the minimum weighted fuel penalty for each set of operating conditions such as space velocity, temperature, oxygen concentration, and carbon loading.

A periodic or need-based reactivation of the NOx catalyst 30 during operation may be realized by following different methods. One example of a method to estimate the NOx catalyst 30 performance is to maintain reference databases and use the measured system parameters during operation for comparison. For example, a reference database relating various system parameters and the carbon loading at those conditions may be maintained. Another reference database relating the reactivation effects of different second reductants on the NOx catalyst 30 may be maintained. The system parameters during service are measured and used as inputs to estimate carbon loading and to determine the appropriate dosing strategy by comparing measured data with the reference databases.

In one embodiment, the catalyst may be regenerated by increasing temperature of the catalyst to a level that is sufficient to desorb or oxidize carbonaceous materials deposited over the catalyst 30. Temperature of the catalyst may be increased, for example, by directly heating the catalyst 30 or by increasing temperature of the gases coming into contact with the catalyst 30. In one embodiment, a heater 70 is employed to heat catalyst 30 and/or the gases. Temperature may be increased for a predetermined amount of time, to clean the surface of the catalyst. Examples of temperatures at which the HC-SCR catalyst may be regenerated include, but are not limited to, between approximately 400° C. to 600° C., 425° C. to 500° C., and 440° C. to 460° C. In one embodiment, the catalyst is regenerated by operating at changed dosing strategy and increased temperature simultaneously for a predetermined amount of time. For example, the dosing may be controlled to be about 3:1 ratio of oxygenate to fuel while the temperature experienced by the catalyst is in the range of about 400° C. to about 600° C. This may enhance oxidation of carbonaceous materials from the catalyst surface and thereby realize an effective regeneration.

By regenerating the catalyst periodically, or whenever catalyst activity is reduced below a certain required level, in accordance with the embodiments described herein, the overall lifetime and performance of the catalyst may be improved.

In one embodiment, a method of treating exhaust is provided. The method comprises producing an exhaust stream 16 from an exhaust source 12 and injecting a reductant stream 18 from a reductant source 14 to the exhaust stream 18. The reductant source 14 comprises a first reductant and second reductant. As described earlier, the reductant source 14 may be a combination of different storage places for the different reductants. Reductant source 14 may include one or more storage places (tanks) for reductants or may include one or more points of origins for continuous supply of reductants. The reductant source 14 may be designed to supply two or more reductants. In one embodiment, different storage places of the reductant source 14 may exist separately from one another within the exhaust treatment system 10. In another embodiment, the storage places of the reductant source 14 may co-exist, for example, where the first and second reductants are to be stored as a mixture, in one storage place. A nitrogen oxide (NOx) reduction catalyst 30 is disposed to receive the exhaust stream 16 and the reductant stream 18. A sensor 40 is operated to sense a system parameter related to carbon loading of the catalyst 30 producing a signal 42 corresponding to the system parameter and sending the signal 42 to a controller 50. The controller 50 controls a dosing of the reductant stream 18 based at least in part on the signal 42.

In one embodiment, the sensor 40 is operated to assess a system parameter, and a controller 50 is operated to receive and analyze signals 42 coming from the sensor 40 and reduce NOx in the exhaust by adjusting dosing of the reductant stream 18. The sensor 40 may communicate with the exhaust source 12, reductant source 14, NOx catalyst 30, post NOx treatment exhaust gases 60, and/or controller 50.

In one embodiment, the controller 50 controls the dosing by changing a ratio of second reductant to first reductant. Normally, in an embodiment including a fuel as a first reductant and an oxygenate as a second reductant, the ratio of second reductant to first reductant in the reductant stream is increased to decrease the carbon loading on the catalyst. In one embodiment, the controller 50 causes a ratio of the second reductant to the first reductant in the reductant stream to be greater than 0.5 when an estimated carbon loading exceeds a predetermined value. In another embodiment, controller 50 causes a ratio of the second reductant to the first reductant in the reductant stream to be greater than 3 when an estimated carbon loading exceeds a predetermined value.

In one embodiment, the carbon loading is estimated by the controller 50 based on system parameter information received from the sensor 40 and using system parameter information as input to estimate the corresponding carbon loading and required dosing strategy by using preloaded correlations in the form of transfer functions or look-up tables. In one embodiment, the carbon loading is estimated by analyzing the signal corresponding to a system parameter comprising an exhaust stream composition parameter, an exhaust stream temperature parameter, an exhaust stream flow parameter, an exhaust source parameter, a time parameter, or any combination of these parameters.

Regeneration is a temporary event when compared to reactivation, and is used to "recover" the catalyst to enable the catalyst to function more efficiently compared to pre-regeneration state of the catalyst. In regeneration, the second reductant promotes the burning off of the deposits on the catalyst and clears the catalyst areas for reaction with the exhaust gases. In one embodiment, the regeneration is carried out by passing a significant amount of second reductant for a certain duration of time, so that the reaction between the second reductant and the carbon loading leads to carbon burning off. In a further embodiment, second reductant is solely used for an estimated time. During this time, the second reductant functions as a reductant as well as a chemical regenerator. In one embodiment, a regeneration is carried out for a fixed point of time. In one embodiment, calculated duration of time for regeneration is in the range from about 10 minutes to about 60 minutes.

The decision whether to reactivate or regenerate a catalyst at any given situation may depend on certain conditions. Weighted fuel penalty is one of the factors to be considered for deciding on reactivation or regeneration. The second reductant used for the reactivation may be the same as or different from the second reductant used for regeneration. If same reductant is used as a second reductant for reactivation as well as regeneration, the amount of fuel used over a certain period of time may be a factor to consider. If the reductants used are different in each case, then the cost of second reductant along with the tank capacity be compared for deciding one method against another. The factors such as catalyst type and carbon loading of the catalyst may also be considered in choosing between reactivation or regeneration of the catalyst at a given point of time.

A reactivation of the catalyst may be carried out in an intermittent manner or in a continuous manner. In a continuous manner, a small amount of second reductant or oxygenate may be supplied along with the first reductant or fuel throughout the operation of the exhaust source. Ratio of the reductants or flow rates of the reductants may be varied such that desired NOx conversions are realized at different points of time during operation.

In one embodiment, the controller 50 changes dosing for the reductant stream when an estimated carbon loading is greater than a predetermined value of about 1 weight percent of the catalyst. In one embodiment, the controller 50 changes dosing for the reductant stream when an estimated carbon loading is greater than a predetermined value of about 5 weight percent of the catalyst. In one embodiment, when the carbon loading is in the range of about 1 to about 5 weight percent, the controller 50 controls the dosing to reactivate the catalyst. In one embodiment, when the carbon loading is greater than 5 weight percent of the catalyst, the controller 50 controls the dosing to regenerate the catalyst. The dosing may be achieved by varying the ratio of second reductant and first reductant through changing the flow rate of first reductant and/or second reductant.

Figure 2:
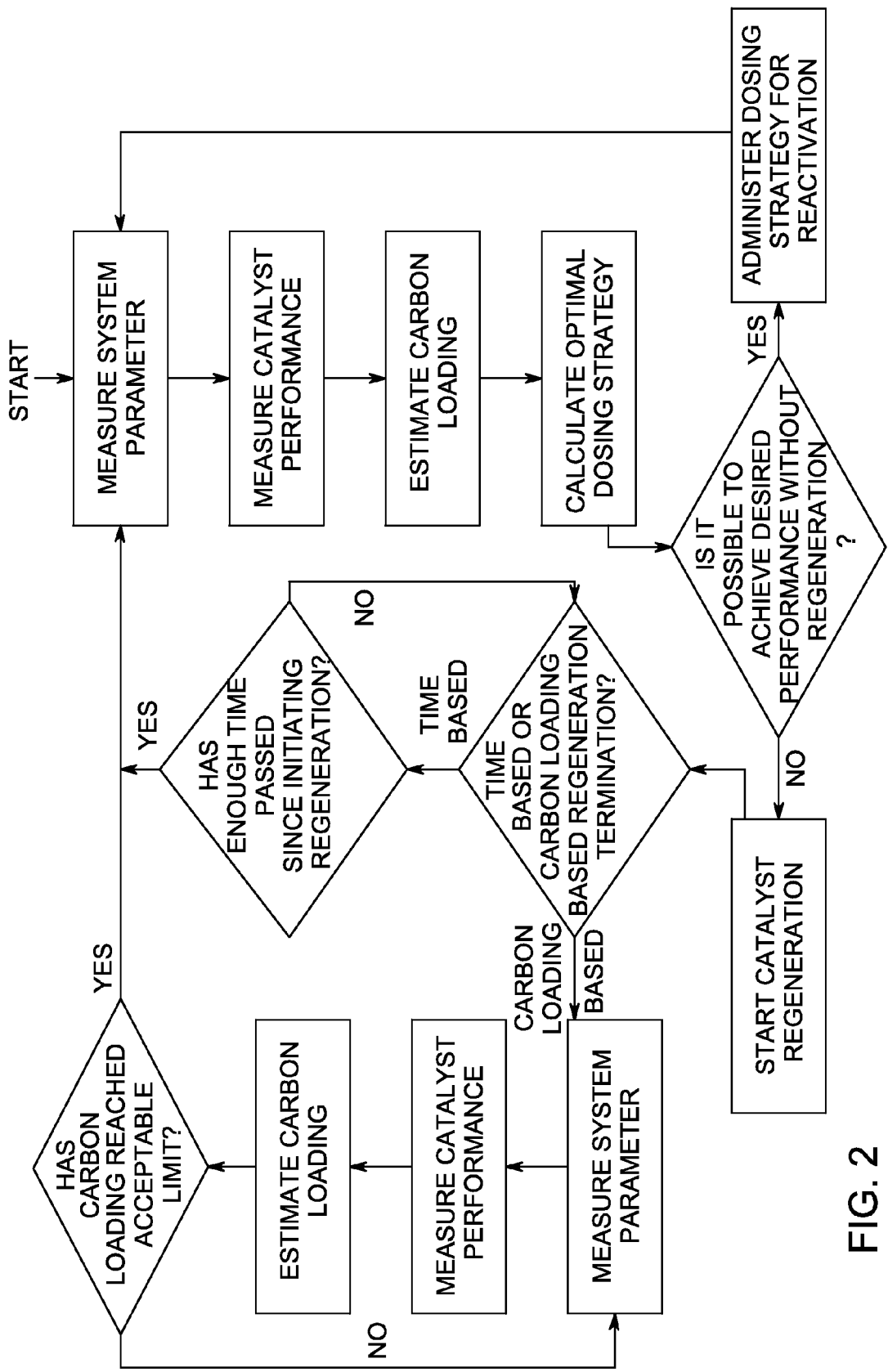
FIG. 2 is a process map of an exhaust treatment method s in accordance with one example of the invention.

FIG. 2 shows an example process map of an exhaust treatment employing the sensor 40 and controller 50. The system parameters (operating conditions) are monitored either continuously or periodically to assess the carbon loading on the catalyst 30, in anticipation of a trigger signal. When the controller 50 receives a trigger signal 42, the controller calculates the optimal dosing strategy. Based on the dosing strategy and predetermined parameter relationships, the controller decides whether a reactivation process is sufficient to reactivate the catalyst and achieve required NOx reduction performance out of it, or a regeneration is necessary. In one embodiment, the decision about using reactivation or regeneration is based on the estimated carbon loading on the catalyst 30. In one embodiment, if the carbon loading is more than about 5 wt % of the catalyst 30, a regeneration is selected by the controller 50 over a reactivation. If the reactivation is found to be sufficient, the controller 50 initiates an elected dosing strategy for reactivation and the system parameters are monitored by the sensors to assess carbon loading. If a regeneration is found to be preferred for the effective performance of the catalyst, the controller 50 initiates an elected dosing strategy for regeneration and the system parameters are monitored by the sensors to assess carbon loading. In one embodiment, the regeneration may be terminated by withdrawing the elected dosing strategy for regeneration. Termination may be based on the time passed during regeneration or based on an estimated decrease in carbon loading. The regeneration time and the dosing levels are calculated and administered by the controller 50 while the sensor 40 continues to monitor system parameters to give feedback about catalyst performance to the controller 50.

In one embodiment, temperature of the exhaust stream 16 or a combination of the exhaust stream 16 and reductant stream 18 is controlled by the controller 50 by using a heater 70. The carbon loading of the catalyst 30 is expected to decrease and the catalyst regeneration is expected to increase by increasing the temperature of the catalyst environment. Depending on the catalyst involved and its temperature zone of optimum activity, reactivation of catalyst also may be helped by the temperature increment. In one embodiment, temperature of an exhaust stream 16 flowing to the catalyst 30 is controlled to be in the range of about 450° C. to about 650° C. In one embodiment, controller 50 activates the heater and/or dosing of reductant stream 18, depending on the carbon loading on the catalyst 30 and/or calculated weighted fuel penalty for the reactivation or regeneration of the catalyst 30.

In one embodiment, temperature of the exhaust stream 16 is increased to greater than about 400° C., along with controlling the dosing. The changed dosing and/or increase in temperature may be in effect for a predetermined duration of time. The time duration may also vary depending on the temperature of the exhaust stream or catalyst and designed dosage of the reductant stream. For example, in one embodiment using silver on mesoporous alumina as the NOx catalyst, if the increment in temperature is greater than about 550° C., then time duration for the regeneration is less than about 30 minutes. Similarly, if ratio of the oxygenate to fuel is greater than 5, time duration required for the regeneration is typically less than about 30 minutes.

One technical advantage of this invention over using only a highly active reductant, such as ethanol, is that less reductant may be required because the engine fuel such as diesel, already on board, may be used at higher exhaust temperatures. This system may also have advantages over a system that only uses engine fuel, because it may achieve higher NOx conversions at lower and middle temperatures by injecting less diesel and more ethanol. Further, as the catalyst 30 loses activity over time, the NOx conversion may be boosted by injecting a greater proportion of ethanol.

The embodiments described herein are examples of composition, system, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes composition, system and methods that do not differ from the literal language of the claims, and further includes other compositions and articles with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A method, comprising:
sensing a system parameter related to carbon loading of a catalyst, producing a signal corresponding to the system parameter and sending the signal to a controller; and
controlling a dosing of a reductant stream based at least in part on the signal.

2. The method of claim 1, wherein the reductant stream comprises a first reductant and a second reductant.

3. The method of claim 2, wherein the first reductant comprises diesel, biodiesel, ultra low sulphur diesel, Fischer-Tropsch fuel, kerosene, or any combinations thereof.

4. The method of claim 2, wherein the second reductant comprises ethanol, methanol, isopropyl alcohol, n-propanol, n-butanol, methyl tert-butyl ether, E85, gasoline, or any combinations thereof.

5. The method of claim 2, wherein the controller controls the dosing by varying a ratio of second reductant to the first reductant, a flow rate of first reductant, a flow rate of second reductant, or a combination of any of the foregoing.

6. The method of claim 5, wherein the controller controls a ratio of the second reductant to the first reductant in the reductant stream to be greater than 0.5 when an estimated carbon loading exceeds a predetermined value.

7. The method of claim 6, wherein the controller controls a ratio of the second reductant to the first reductant in the reductant stream to be greater than 3 when an estimated carbon loading exceeds a predetermined value.

8. The method of claim 6, wherein the predetermined value is greater than about 1 weight percent of the catalyst.

9. The method of claim 6, wherein the carbon loading is estimated by analyzing the signal corresponding to a system parameter comprising an exhaust stream composition parameter, an exhaust stream temperature parameter, an exhaust stream flow parameter, an exhaust source parameter, a time parameter, or a combination thereof.

10. The method of claim 9, wherein the exhaust stream composition parameter comprises a concentration of NOx in an exhaust stream and a space velocity of the catalyst.

11. The method of claim 9, wherein the exhaust stream temperature parameter comprises temperature of the catalyst and temperature of an exhaust stream.

12. The method of claim 11, wherein the temperature of the exhaust stream is between about 200° C. and about 650° C.

13. The method of claim 9, wherein the exhaust stream flow parameter comprises a molar, mass or volumetric flow rate of an exhaust stream, fuel stream, or air stream.

14. The method of claim 9, wherein a ratio of the molar flow rate of carbon in the reductant stream to the molar flow rate of nitrogen in NOx in an exhaust stream is between 0 and 12.

15. The method of claim 2, wherein the first reductant is a fuel and the second reductant is an oxygenate.

16. A method, comprising:
producing a reductant stream;
injecting a fuel into an exhaust stream;
sensing a system parameter related to carbon loading of a catalyst disposed to receive the exhaust stream and the reductant stream, producing a signal corresponding to the system parameter and sending the signal to a controller;

comparing the signal with a predetermined value;

estimating the carbon loading;

injecting an oxygenate into the exhaust stream if the carbon loading is estimated to exceed a predetermined level; and regulating a ratio of oxygenate to fuel in the exhaust stream for a calculated duration of time, wherein the system parameter is a post-catalyst NOx concentration, a space velocity of the catalyst, temperature of the catalyst, temperature of the exhaust stream, a flow rate of the exhaust stream, or any combinations thereof.

17. The method of claim 16, wherein the calculated duration of time is in the range of about 10 minutes to about 60 minutes.

18. The method of claim 16, wherein the temperature of the exhaust stream is between about 200° C. and about 650° C.

19. The method of claim 18, wherein a temperature of the exhaust stream flowing to the catalyst is in the range of about 450° C. to about 650° C.

20. A method, comprising:
producing a reductant stream and directing the reductant stream to be received by a catalyst;
producing an exhaust stream and directing the exhaust stream to be received by the catalyst;
injecting a fuel into the exhaust stream;
sensing a post catalyst NOx concentration and sending the signal corresponding to the post catalyst NOx concentration to a controller;
comparing the signal with a predetermined threshold point of post catalyst NOx concentration;
determining the time when the post catalyst NOx concentration exceeds the threshold point; and
regenerating the catalyst by injecting an oxygenate into the exhaust stream for a calculated duration of time.

* * * * *